United States Patent
Kim

(10) Patent No.: US 8,730,884 B2
(45) Date of Patent: May 20, 2014

(54) METHOD FOR MANAGING RESOURCES IN HIGH CAPACITY WIRELESS COMMUNICATION SYSTEM

(75) Inventor: Yun-Joo Kim, Suwon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 775 days.

(21) Appl. No.: 12/908,309

(22) Filed: Oct. 20, 2010

(65) Prior Publication Data

US 2011/0090855 A1 Apr. 21, 2011

(30) Foreign Application Priority Data

Oct. 20, 2009 (KR) .................. 10-2009-0099914

(51) Int. Cl.
*H04W 4/00* (2009.01)
*H04L 12/413* (2006.01)

(52) U.S. Cl.
USPC .......................................... 370/329; 370/448

(58) Field of Classification Search
USPC ........................................................ 370/329
See application file for complete search history.

(56) References Cited

U.S. PATENT DOCUMENTS

| | | | |
|---|---|---|---|
| 7,408,908 B2 | 8/2008 | Li et al. | |
| 7,567,612 B2 | 7/2009 | Stephens et al. | |
| 2005/0135318 A1 * | 6/2005 | Walton et al. | 370/338 |
| 2005/0265297 A1 * | 12/2005 | Nakajima et al. | 370/338 |
| 2007/0037548 A1 * | 2/2007 | Sammour et al. | 455/343.2 |
| 2008/0107156 A1 * | 5/2008 | Wentick et al. | 375/134 |
| 2008/0144586 A1 * | 6/2008 | Kneckt et al. | 370/337 |
| 2009/0213741 A1 | 8/2009 | Wang et al. | |
| 2009/0323608 A1 * | 12/2009 | Adachi et al. | 370/329 |
| 2010/0080173 A1 * | 4/2010 | Takagi | 370/328 |
| 2010/0172334 A1 * | 7/2010 | Akhmetov | 370/338 |
| 2010/0177757 A1 * | 7/2010 | Kim et al. | 370/338 |
| 2010/0329195 A1 * | 12/2010 | Abraham et al. | 370/329 |
| 2011/0096710 A1 * | 4/2011 | Liu et al. | 370/312 |

FOREIGN PATENT DOCUMENTS

| | | | |
|---|---|---|---|
| KR | 1020080110175 A | | 12/2008 |
| KR | 1020100050633 A | | 5/2010 |

* cited by examiner

*Primary Examiner* — Gerald Smarth

(57) ABSTRACT

Provided is a method for managing resource in a high capacity wireless communication system capable of communicating with two or more users in a multi-input multi-output (MIMO) scheme when a base station transmits data. The includes: transmitting a MU-MIMO request-to-send (RTS) message to stations intending to transmit data in the MIMO scheme, and sequentially receiving a clear-to-send (CTS) message from stations intending to receive the data; transmitting a transmission ACK message to the stations, wherein the transmission ACK message includes information which prevents data collision during a time of data transmission to the stations and ACK signal; and configuring data to be transmitted to the stations into aggregated packets (A-MPDUs), transmitting the A-MPDUs to the stations in the MIMO scheme, and receiving a block ACK message from the stations.

20 Claims, 9 Drawing Sheets

METHOD FOR MANAGING RESOURCES IN HIGH CAPACITY WIRELESS COMMUNICATION SYSTEM

CROSS-REFERENCE(S) TO RELATED APPLICATIONS

The present application claims priority of Korean Patent Application No. 10-2009-0099914, filed on Oct. 20, 2009, which is incorporated herein by reference in its entirety.

BACKGROUND OF THE INVENTION

1. Field of the Invention

Exemplary embodiments of the present invention relate to an apparatus and method for managing resources in a high capacity wireless communication system; and, more particularly, to an apparatus and method for managing resources in a high capacity wireless communication system using a multi-user multi-input multi-output (MU-MIMO) technique.

2. Description of Related Art

As data a wireless communication system transmits data as well voice, its capacity continues to become higher. In order to increase the total throughput of a high capacity wireless communication system, finite resources must be efficiently managed. Therefore, the efficient resource management is a very important factor in a wireless communication system.

Meanwhile, a wireless communication system uses a MIMO technique in order to use finite wireless resources more efficiently. Such a MIMO technique is used in diverse fields and can obtain various gains, such as antenna diversity, space diversity, and so on.

While high capacity multimedia services are actively provided in a wireless communication system by using such various techniques, the performance of the wireless communication system is not high. Also, since multi-users share wireless resources, the transmission speed of the wireless service, which is actually felt by the users, is remarkably lowered. Therefore, much research have been conducted to increase the performance of the wireless system by expanding wireless resources shared by the multi-users or using wireless resources of the same bandwidth as specific beams in the communication with each user.

With the development trend of such wireless communication systems, the IEEE 802.11 work group AC set the orientation as below and started to progress the standardization.

First, three multi-stations constituted with one AP and two stations are considered in order to configure a high speed wireless communication system. Second, MAC SAP of an access point (AP) must support the performance up to 1 Gbps. Third, MAC SAP of a wireless station for a point-to-point environment requires up to 500 Mbps. Fourth, the AP and the wireless station must be able to simultaneously support the compatibility with an existing wireless LAN system (IEEE 802.11a/n system).

The IEEE 802.11 work group AC proposed such features as the requirements of the high performance wireless communication system, but the service structures and wireless service providing methods which support such high speed techniques are not specifically defined. Therefore, there is a need for apparatus and method for supporting such high speed techniques.

SUMMARY OF THE INVENTION

An embodiment of the present invention is directed to an apparatus and method which can simultaneously provide a service to one or more users by sharing the same bandwidth in a wireless LAN system and transmitting data by using different specific beams with respect to each user.

Another embodiment of the present invention directed to a communication apparatus and method which can meet requirements required by the IEEE 802.11 work group AC.

Another embodiment of the present invention is directed to an apparatus and method which can increase the efficiency of wireless resources by supporting a multi-user MIMO technique at each channel in a wireless LAN system.

Another embodiment of the present invention is directed to an apparatus and method which can reduce contention overhead of a wireless LAN system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for managing resource in a high capacity wireless communication system capable of communicating with two or more users in a multi-input multi-output (MIMO) scheme when a base station transmits data, includes: transmitting a MU-MIMO request-to-send (RTS) message to stations intending to transmit data in the MIMO scheme, and sequentially receiving a clear-to-send (CTS) message from stations intending to receive the data; transmitting a transmission ACK message to the stations, wherein the transmission ACK message includes information which prevents data collision during a time of data transmission to the stations and ACK signal; and configuring data to be transmitted to the stations into aggregated packets (A-MPDUs), transmitting the A-MPDUs to the stations in the MIMO scheme, and receiving a block ACK message from the stations.

In accordance with another embodiment of the present invention, a method for managing resource in a high capacity wireless communication system capable of communicating with two or more users in a multi-input multi-output (MIMO) scheme when a base station allocates the resources, includes: transmitting an ACK when a poll request message is received from stations which are capable of communicating with the base station; and transmitting a poll frame scheduled based on the poll request frame received from the stations upon transmission of the poll frame for permitting data transmission to the station through an uplink.

DESCRIPTION OF SPECIFIC EMBODIMENTS

Figure 1:
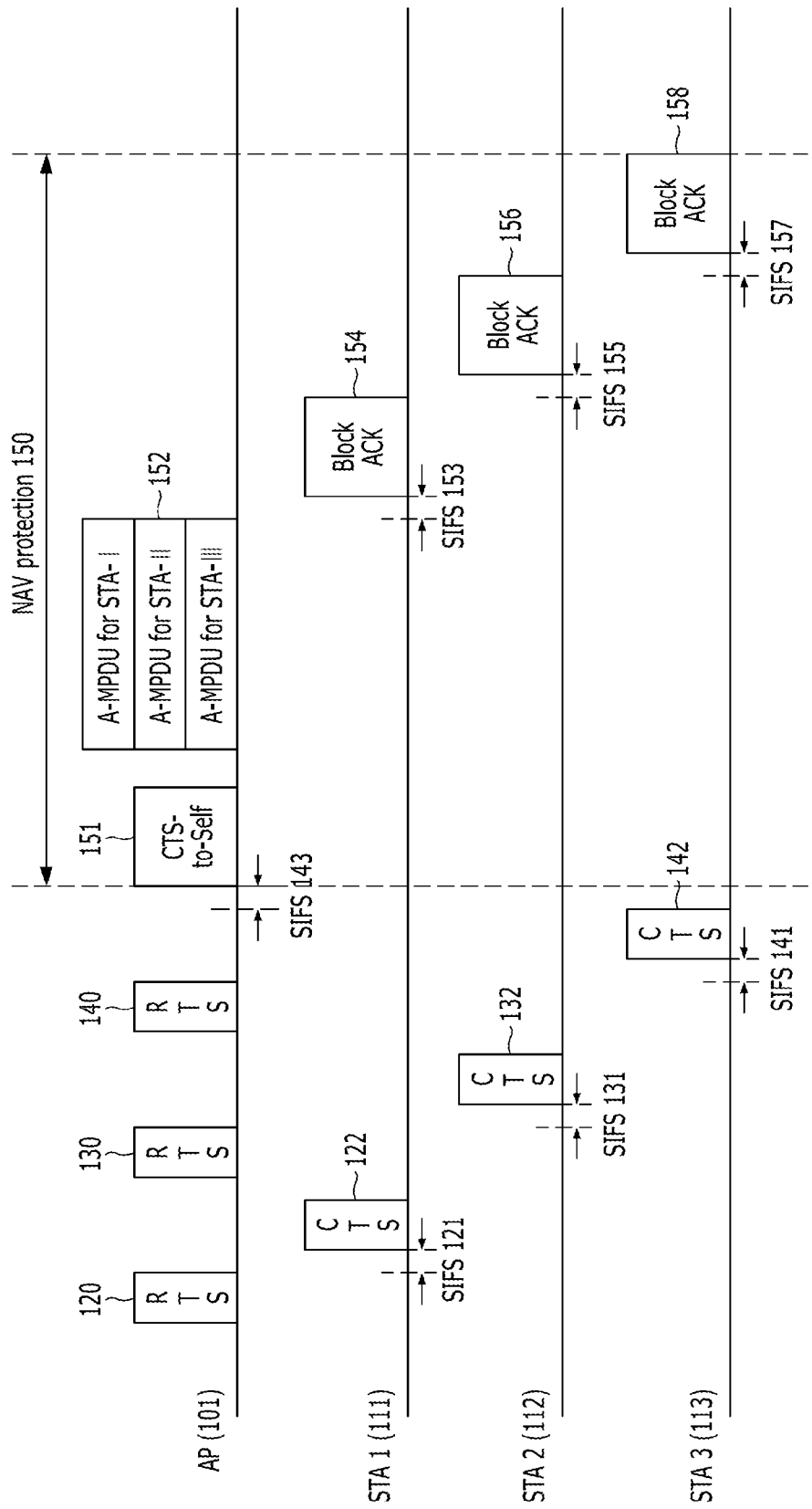
FIG. 1 is a message timing diagram for a downlink service between an AP and stations in a multi-user MIMO (MU-MIMO) system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An embodiment of the present invention is directed to an apparatus and method which can simultaneously provide a wireless service to one or more users by transmitting data using different specific beams sharing the same bandwidth.

Also, an embodiment of the present invention directed to an apparatus and method which can simultaneously support a multi-user MIMO technique in each channel while increasing wireless resources by expanding a bandwidth in order to meet requirements of a high performance wireless communication system.

Also, an embodiment of the present invention is directed to an apparatus and method which can more efficiently support a wireless service in a wireless LAN environment based on an MU-MIMO technique capable of increasing the efficiency of wireless resources. That is, embodiments of the present invention are directed to resource management wireless service architecture, exemplary services, and apparatus and method which can support such services.

Also, an embodiment of the present invention directed to an apparatus and method which can include a data request in an ACK procedure of a downlink service based on a MU-MIMO. In this embodiment, wireless resources can be efficiently used. That is, an embodiment of the present invention is directed to an apparatus and method which can reduce contention overhead of a wireless LAN system based on contention by setting data transmission priority through a data request during an ACK procedure of a MU-MIMO scheme.

The following description will be made based on a wireless communication system defined in IEEE 802.11 among various high speed wireless communication systems. Also, a method for using multi-channels required by the IEEE 802.11 work group AC will be described. To this end, there will be proposed a data transmission apparatus and method of a wireless communication system using a MU-MIMO system at each channel. A transmission method of a wireless communication system in accordance with an embodiment of the present invention includes a basic operation of simultaneously supporting a service to one or more stations by using specific beam according to RTS/CTS/DATA/ACK frame exchange sequence based on IEEE 802.11 wireless LAN.

Also, a MAC protocol supporting a downlink MIMO in accordance with an embodiment of the present invention must acquire channel usage opportunity by using IEEE 802.11 Enhanced Distributed Channel Access (EDCA) and exchange RTS-CTS frames prior to data transmission.

FIG. 1 is a message timing diagram for a downlink service between an AP and stations in a MU-MIMO system in accordance with an embodiment of the present invention.

Prior to description of FIG. 1, basic assumptions will be described. In the timing diagram of FIG. 1, it is assumed that both an AP 101 and stations use a MU-MIMO technique, and the AP 101 and the stations are wireless station. Also, it is assumed that the communication is performed in order of the AP 101 and the first station 111, the AP 101 and the second station 112, and the AP 101 and the third station 113. Also, it is assumed that the AP 101 uses an EDCA protocol.

When the AP 101 transmits a request-to-send (RTS) 120 to the first station 111, the first station 111 waits for a predetermined short inter-frame time (SIFS) 121 and transmits a clear-to-send (CTS) to the AP 101. At this time, the AP 101 can notify the MU-MIMO-based data transmission by enabling a MU-MIMO usage flag in a transmission header of a MAC or PHY layer of an RTS frame 120 (for example, a MAC header or a service field of a PHY preamble). Also, the first station 111 having received the RTS transmits CTS 122 and waits until a MU-MIMO downlink service is started from the AP 101.

Then, the AP 101 again transmits RTS 130 to the second station 112, and the second station 112 waits for an SIPS 131 and transmits a CTS 132 to the AP 101 in response to the RTS 130. Finally, the AP 101 transmits an RTS 140 to the third station 113, and the third station 113 waits for an SIFS 141 and transmits a CTS 142 in response to the RTS 140. The operation of the second station 112 and the third station 113 are substantially identical to that of the first station 111.

In order to start the downlink service after the ACK is successfully received from all multi-user stations 111, 112 and 113, the AP 101 transmits a CTS-to-self frame 151 including a network allocation vector (NAV) protection 150 to the AP 101 itself, and transmits aggregated MPDU (A-MPDU) 152 to be transmitted to the stations 111, 112 and 113. At this time, the transmission is performed using a MU-MIMO scheme.

The multi-user stations 111, 112 and 113 receiving the A-MPDU 152 transmit block ACKs 154, 156 and 158. As described above, the transmission of the A-MPDU 152 and the block ACK or the transmission of the block ACKs is performed at time intervals corresponding to the SIFSs 153, 155 and 157.

Also, information for the transmission order of the block ACK frames and the ACK of the multi-user stations 111, 112 and 113 may be included in the transmission header of the MAC or PHY layer of the CTS-to-self frame or the MU-MIMO A-MPDU frame received during the downlink service period. The A-MPDU frame directed to each wireless station may be generated and transmitted in the AP 101 in a form for a MU-MIMO, such that the total length of PPDU becomes equal even though the length of data is different.

As illustrated in FIG. 1, the basic frame exchange procedure can improve the performance by using the MU-MIMO technique capable of simultaneously transmitting data to the multi-users, but resources may be wasted in order for exchange of RTS/CTS increasing in proportion to the number of the multi-users. Therefore, in order to further increase the performance efficiency of the downlink MU-MIMO, the AP 101 supporting the MU-MIMO technique transmits data to the multi-users. Thus, The AP 101 may transmit MU-MIMO RTS which has a multicast address containing one or more destination as a destination address or includes predefined multi-user information.

Also, the above-described multi-user information may include a list of a downlink MU-MIMO usage flag, a multi-user group ID (for example, MAC address form), and/or a multi-user ID (for example, association ID or MAC address). The multi-user information may be identical to the multi-user information as described above with reference to FIG. 1 and may also include information for ACK (for example, ACK order, ACK frame transmission speed, and transmission length of ACK frame).

The operation of a multi-link MU-MIMO using MU-MIMO RTS in accordance with another embodiment of the present invention will be described below.

Figure 2:
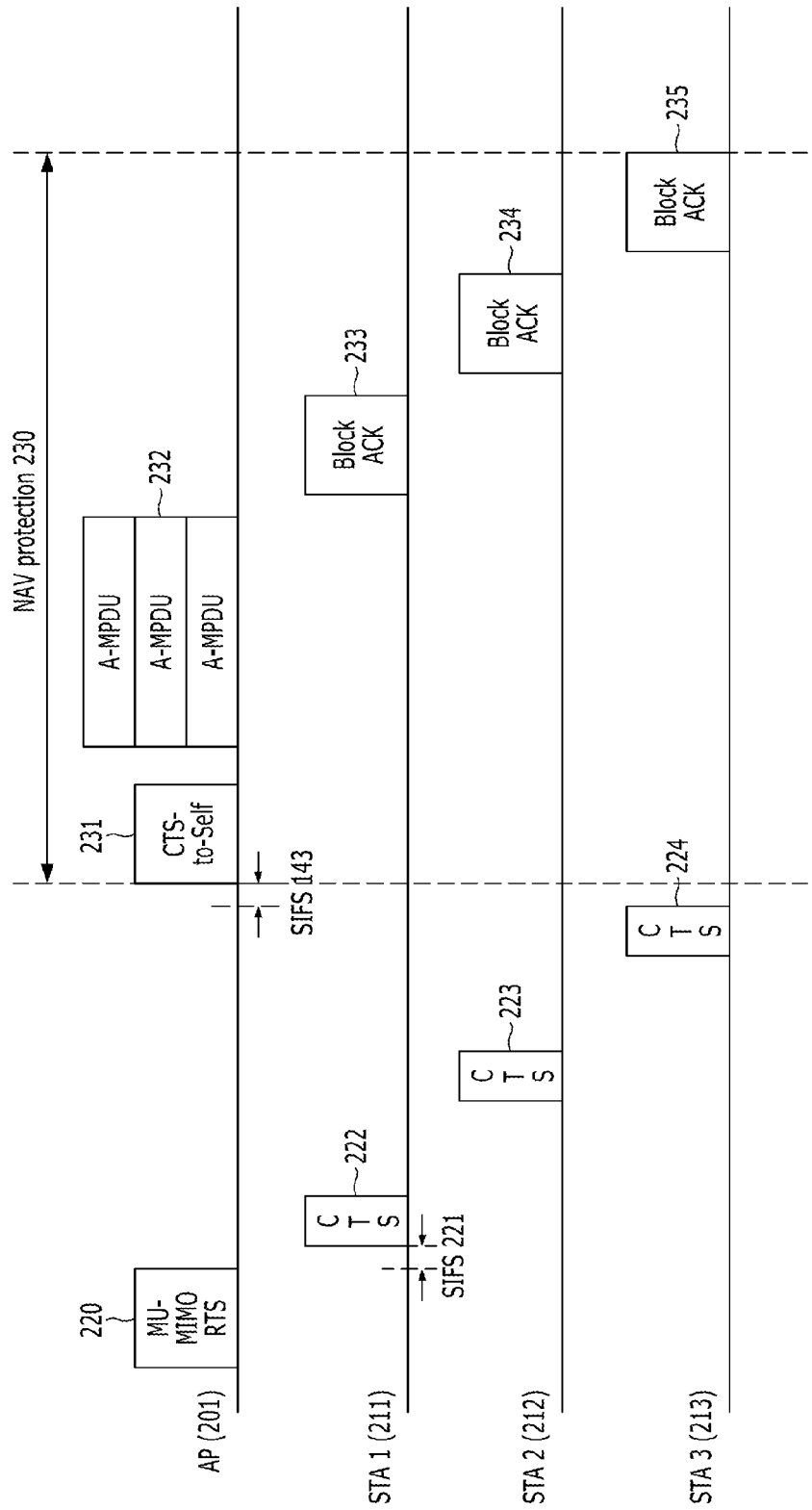
FIG. 2 is a message timing diagram illustrating the operation of a multi-link MU-MIMO using a MU-MIMO RTS in accordance with another embodiment of the present invention.

FIG. 2 is a message timing diagram illustrating the operation of the multi-link MU-MIMO using the MU-MIMO RTS in accordance with another embodiment of the present invention.

In the description of FIG. 2, it is assumed that the preconditions are identical to those of FIG. 1.

When an AP 201 transmits an RTS frame 220, a first station 211 waits for a predetermined SIFS 221 and transmits a CTS 222 to the AP 201, and a second station 212 waits for an SIFS after the CTS 222 of the first station 211 and transmits a CTS 223 to the AP 201. A third station 213 waits for an SIFS after the CTS 223 of the second station 212 and transmits a CTS 224 to the AP 201.

The MU-MIMO RTS frame 220 includes a multicast address so that it simultaneously transmits the RTS to each station. When each station receives the MU-MIMO RTS frame 220, the stations included in the multicast address transmit the CTSs 222, 223 and 224. At this time, the CTSs 222, 223 and 224 are transmitted at SIFS intervals.

After the exchange of the MU-MIMO RTS/multiple CTSs 222, 223 and 224 corresponding to the exchange of legacy RTS/CTS is completed, the AP 201 receiving all ACKs from the multi-users sets and transmits a NAV protection 230 by using a CTS-to-self in order for data transmission, thereby preventing communication with other stations for a predetermined time. Thereafter, the AP 201 transmits A-MPDUs 232 in a MU-MIMO scheme and receives block ACKs 233, 234 and 235 from the corresponding stations. The exchange of the 3 A-MPDUs 232 and the multiple block ACKs 233, 234 and 235 corresponds to the legacy DATA/ACK frame exchange procedure.

A basic uplink operation to which a MU-MIMO technique is not applied will be described below.

Figure 3:
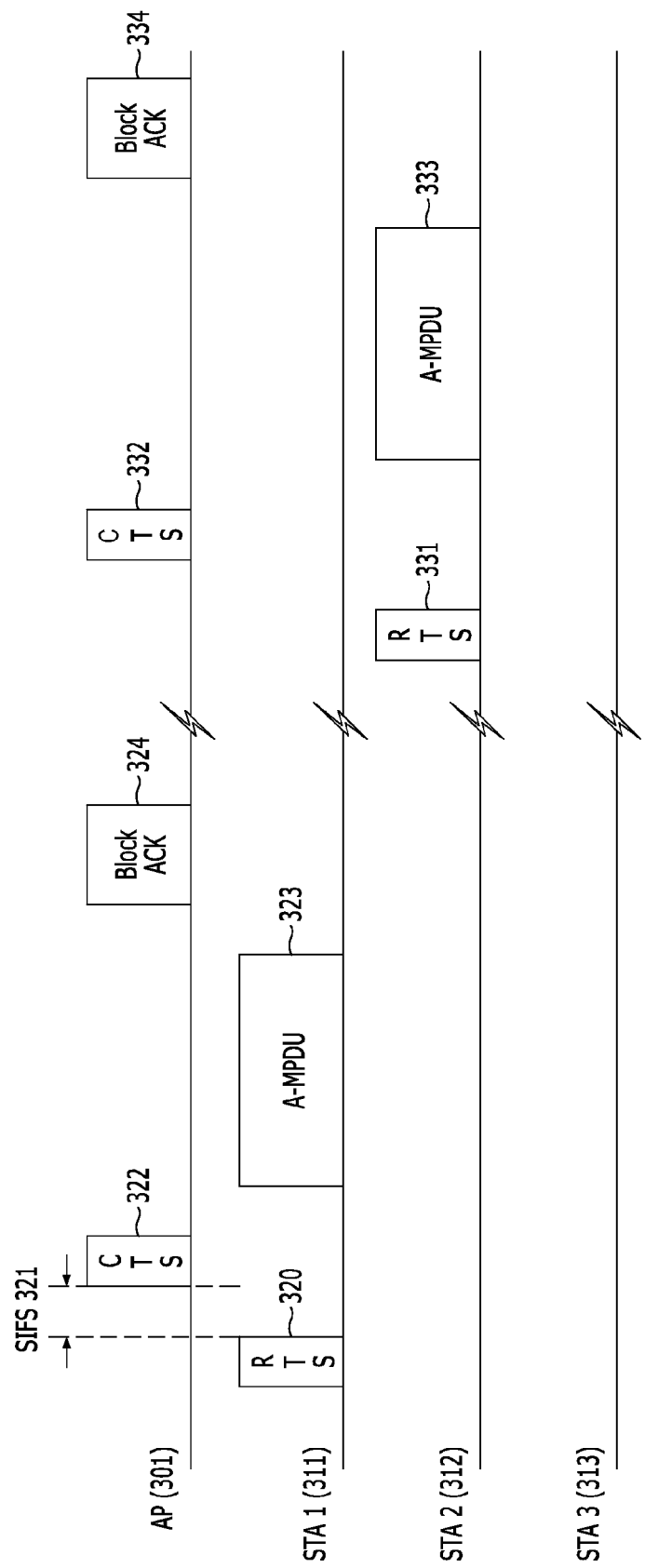
FIG. 3 is a timing diagram upon an uplink transmission to multi-users in accordance with an embodiment of the present invention.

FIG. 3 is a timing diagram of an uplink communication between a station and an AP when an IEEE 802.11 EDAC operation is performed.

When a first station 311 transmits an RTS 320 in order for data transmission to an uplink, that is, an AP 301, the AP 301 waits for an SIFS 321 and transmits a CTS 322 to the first station 322. In this case, it is assumed that the AP 301 and all stations 311, 312 and 313 occupy channels by performing an IEEE 802.11 EDCA operation in order to acquire wireless resources. Therefore, the first station 311 receiving the CTS 322 transmits an aggregated packet (A-MPDU) 323 or a general package (MPDU) to the AP 301. The AP 301 transmits a block ACK 324 in response to the A-MPDU or the MPDU Then, when the second station 312 transmits an RTS 331 to the AP 301 and the AP 301 transmits a CTS 332 to the second station 312, the second station 312 transmits A-MPDU 333 to the AP 301. The AP 301 again transmits the block ACK 334 to the second station.

Since the uplink operation of FIG. 3 is substantially identical to the general data transmission/reception procedure which does not use a downlink MU-MIMO technique, an overhead of a wireless channel is included. Therefore, in order to improve the performance of the uplink data transmission based on the data transmission/reception procedures of FIGS. 1 and 2, an uplink transmission request function (hereinafter, referred to as a poll request) of the multi-users and a method for transmitting a MU-MIMO poll for an uplink of a high capacity AP are required.

The poll request method of the multi-users is a method which notifies the AP by adding data transmission request information to the ACK frame transmitted from the multi-users to the AP, in order to further increase the efficiency of the MU-MIMO applied to the wireless communication system. The poll request method will be described below in more detail.

As described above with reference to FIGS. 1 and 2, frames transmitted from the multi-users to the AP in the MU-MIMO downlink service are RTS ACK frames or data ACK frames. At this time, the multi-users who want to transmit data by using the uplink transmit poll request information by adding data transmission request information (for example, data QoS information such as transmit duration, buffer size, and traffic priority information) to the block ACK frame which is the ACK frame protected by the NAV protection.

The data transmission request information is defined as a new information element or control field and it may be used by modifying reserved bits which are not used within the ACK frame such as the block ACK frame.

Figure 4:
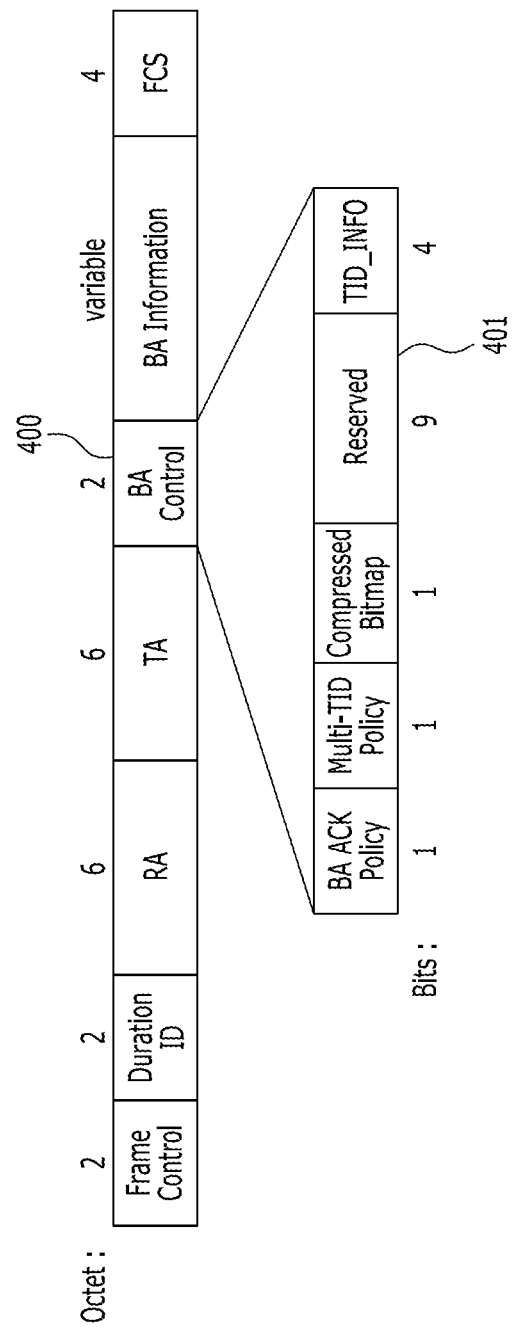
FIG. 4 illustrates reserved bits which are not used within a block ACK control field of a block ACK frame in accordance with an embodiment of the present invention.

FIG. 4 illustrates reserved bits which are not used within a block ACK control field of a block ACK frame in accordance with an embodiment of the present invention.

In a block ACK frame of FIG. 4, a block ACK control field 400 consists of 2 bytes and includes 9-bit reserved bits 401. Therefore, the poll can be requested by predefining the corresponding bits.

Also, the method including the data transmission request information is not limited to the block ACK frame and may be included in all ACK frames received during the downlink data transmission/reception procedure. However, the case in which the data transmission request information is included in the ACK frame protected by NAV can support a higher protection function than the case in which the data transmission request information is included in the ACK frame used for acquire resources for data transmission of network resource reservation (NAV) and so on. Accordingly, the case in which the data transmission request information is included in the ACK frame protected by the NAV has an advantage in that the reliability is increased.

Another embodiment of the present invention will be described below.

Another embodiment of the present invention directed to a method which manages an uplink data usage through a poll function generated by the AP, without EDCA channel contention as illustrated in FIG. 3.

FIG. 3 is a timing diagram upon an uplink transmission to multi-users in accordance with an embodiment of the present invention.

When the AP acquires the channel through the EDCA contention with the station, stations which transmit data to the uplink can be simultaneously polled. A proposed MU-MIMO poll frame includes a multi-poll containing station addresses with respect to multi-users and data information to be received.

Figure 5:
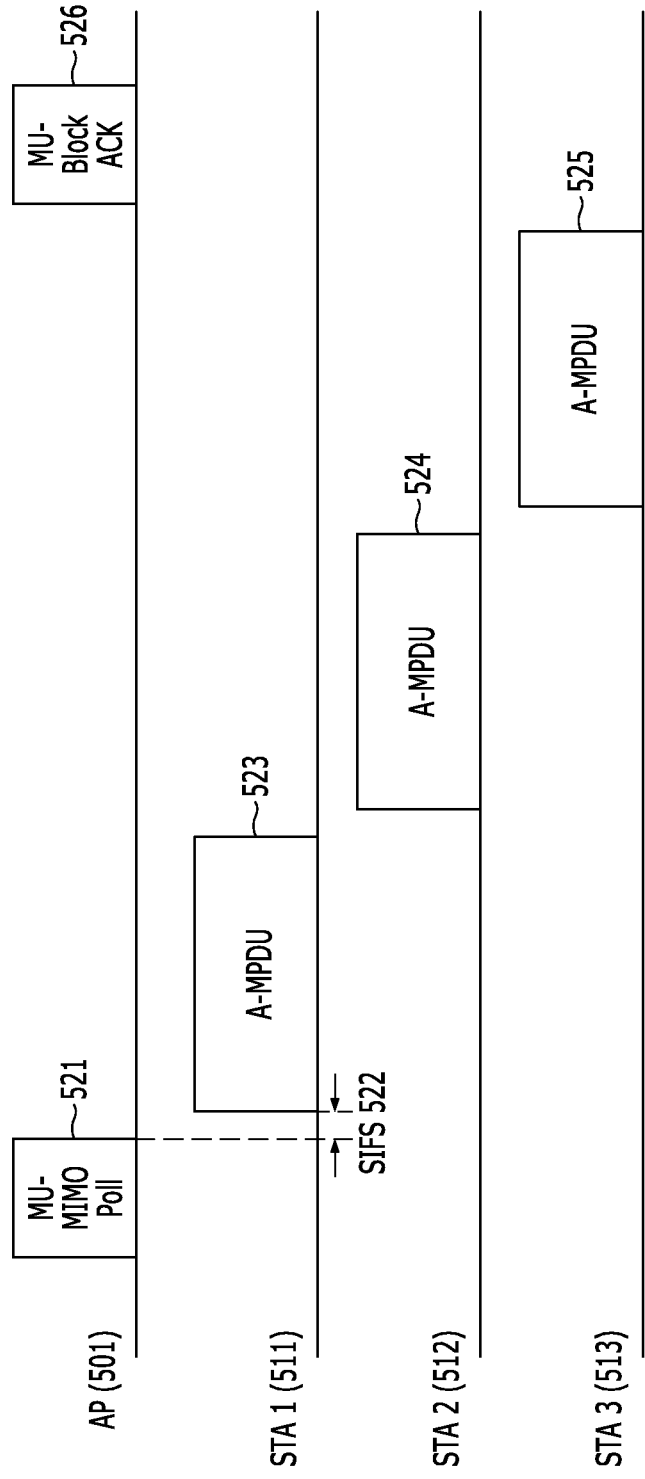
FIG. 5 is a timing diagram for frame transmission and reception upon an uplink transmission and reception by a MU-MIMO poll in accordance with another embodiment of the present invention.

FIG. 5 is a timing diagram for frame transmission and reception upon an uplink transmission and reception by a MU-MIMO poll in accordance with another embodiment of the present invention.

An AP 501 transmits a MU-MIMO Poll frame 521 to multiple stations 511, 512 and 513. The stations 511, 512 and 513 may sequentially transmit aggregated packets 523, 524 and 525 based on a poll in order of the first station 511, the second station 512, and the third station 513. At this time, as described above, the MU-MIMO Poll frame 521 and the aggregated packet 523 transmitted by the first station 511 have a time interval corresponding to an SIFS 522, and the packets also have a time interval corresponding to an SIFS.

Since the stations receiving the poll do not support the uplink MU-MIMO, the stations transmit A-MPDUs 523, 524 and 525 aggregated in order of time. The AP 501 receiving all the A-MPDUs 523, 524 and 525 can simultaneously transmit the block ACK to the multi-users by transmitting the MU-MIMO block ACK frame 526 using the downlink MU-MIMO technique with respect to the multiple wireless stations.

Figure 6:
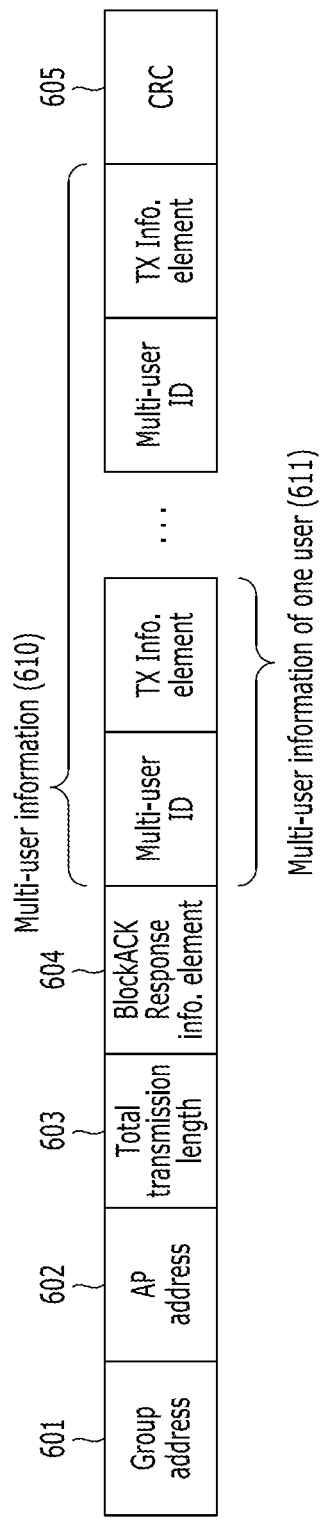
FIG. 6 is an exemplary diagram illustrating uplink multi-user transmission information of a MU-MIMO poll frame in accordance with an embodiment of the present invention.

FIG. 6 is an exemplary diagram illustrating uplink multi-user transmission information of a MU-MIMO poll frame in accordance with an embodiment of the present invention.

Since only the basically necessary elements are illustrated in FIG. 6, information which is not illustrated may be included, and the order or length may be changed according to whether or not other information is included.

The information of the MU-MIMO poll frame of FIG. 6 includes a group address (for example, multicast address or group ID) 601 of multi-users receiving the MU-MIMO poll, AP address 602, a length 603 of a data transmission duration using a total uplink and an ACK reception duration. The duration length 603 is included in order to prevent collision of wireless channels by setting NAV to wireless stations neighboring to the AP which are not included in the multi-user ID.

The MU-MIMO poll frame information includes a block ACK response information element 604. The block ACK response information element 604 is included because data transmission end time points of multi-users transmitting data through the uplink are different. That is, if the multi-user wireless station which has completed the data transmission starts an ACK timer waiting an ACK frame with respect to the transmitted data, the AP which is receiving data from other multi-users cannot perform a transmission operation. Thus, a correct ACK timeout cannot be performed. Therefore, the AP notifies the block ACK response information element 604 including a block ACK type and an expected block ACK frame transmission point. In this manner, the multi-user wireless terminal transmitting data can correctly operate the block ACK timer.

Also, the MU-MIMO poll frame information provides TX information element such as QoS information of data to be transmitted with an ID of a wireless station which will participate in the uplink data transmission (for example, MAC address or association ID), transmission start time, and transmission data length. That is, as illustrated in FIG. 6, the MU-MIMO poll frame includes multi-user information 611 of one user. Such information is included as many as the multi-users as indicated by reference numeral 610.

Also, the MU-MIMO poll frame includes a CRC 605 which can verify error of all information.

Figure 7:
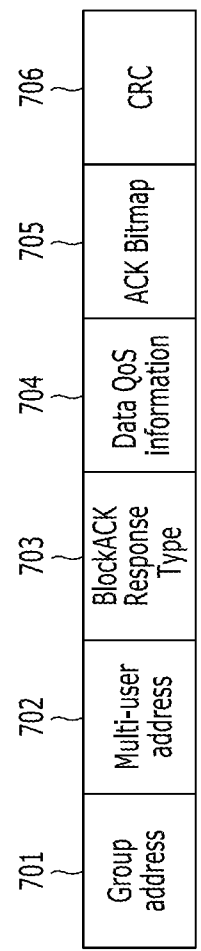
FIG. 7 is an exemplary diagram illustrating a MU-MIMO block ACK frame in accordance with an embodiment of the present invention.

FIG. 7 is an exemplary diagram illustrating a MU-MIMO block ACK frame in accordance with an embodiment of the present invention.

The MU-MIMO block ACK frame includes an AP address 701, a multi-user ID (MAC address or association ID) 702, a block ACK response type 703, QoS information 704 of received data, an ACK bitmap 705, and a CRC 706. In particular, the last frame of TXOP is transmitted in a legacy sequential block ACK format in order to perform a NAV reset. In a case in which the NAV reset is not performed, MU-MIMO block ACK frames are simultaneously transmitted using the downlink MU-MIMO. In order to mark this, the MU-MIMO block ACK frame uses the block ACK response type 703 to represent whether or not there are the received MU-MIMO block ACK and the next block ACK.

Figure 8:
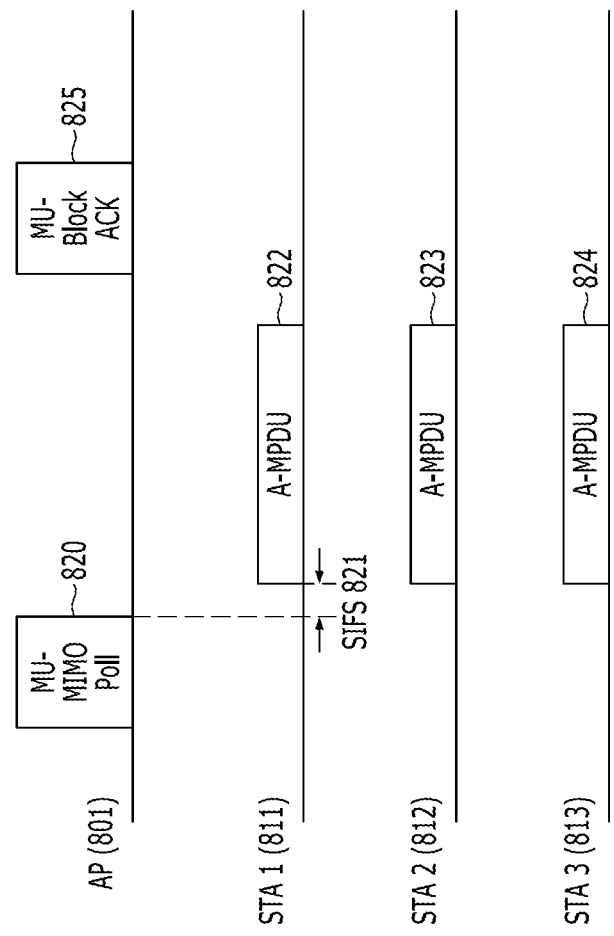
FIG. 8 is an exemplary timing diagram upon a data transmission of a wireless station which supports an uplink MU-MIMO when a MU-MIMO poll frame is used.

FIG. 8 is an exemplary timing diagram upon a data transmission of a wireless station which supports an uplink MU-MIMO when the MU-MIMO poll frame in accordance with the embodiment of the present invention is used.

As described above with reference to FIG. 5, an AP 801 transmits a MU-MIMO poll frame 820 to stations 811, 812 and 813. The stations 811, 812 and 813 wait for a predetermined SIFS 821 and simultaneously transmit aggregated packets (A-MPDU) 822, 823 and 824 to the AP 801. At this time, the stations 811, 812 and 813 receiving the MU-MIMO poll frame can support the uplink MU-MIMO service by transmitting data using specific beams agreed with the AP 801.

The uplink data transmission request method and the downlink MU-MIMO poll frame described above can be independently operated. A detailed description thereof will be made below.

Even in the case in which there is no uplink data transmission request, the downlink MU-MIMO poll frame may be generated using only the traffic QoS information (for example, TCLAS or TSPEC) agreed between the AP and the wireless stations and transmitted to the multi-users.

On the other hand, the uplink data transmission request method and the downlink MU-MIMO poll frame may be simultaneously used. In accordance with the embodiment of the present invention, the high capacity AP having acquired wireless resources through EDCA access adds the MAC address of the wireless station, which has the high priority of data to be transmitted, to the MU-MIMO poll by referring to received data transmission request information and then transmits it. In this manner, transmission opportunity may be given to the wireless station which intends to transmit data to the AP. Through these procedures, the wireless station which intends to transmit data can reduce EDCA contention overhead, which is performed for acquiring the wireless resources, thereby using the wireless resources more efficiently.

Figure 9:
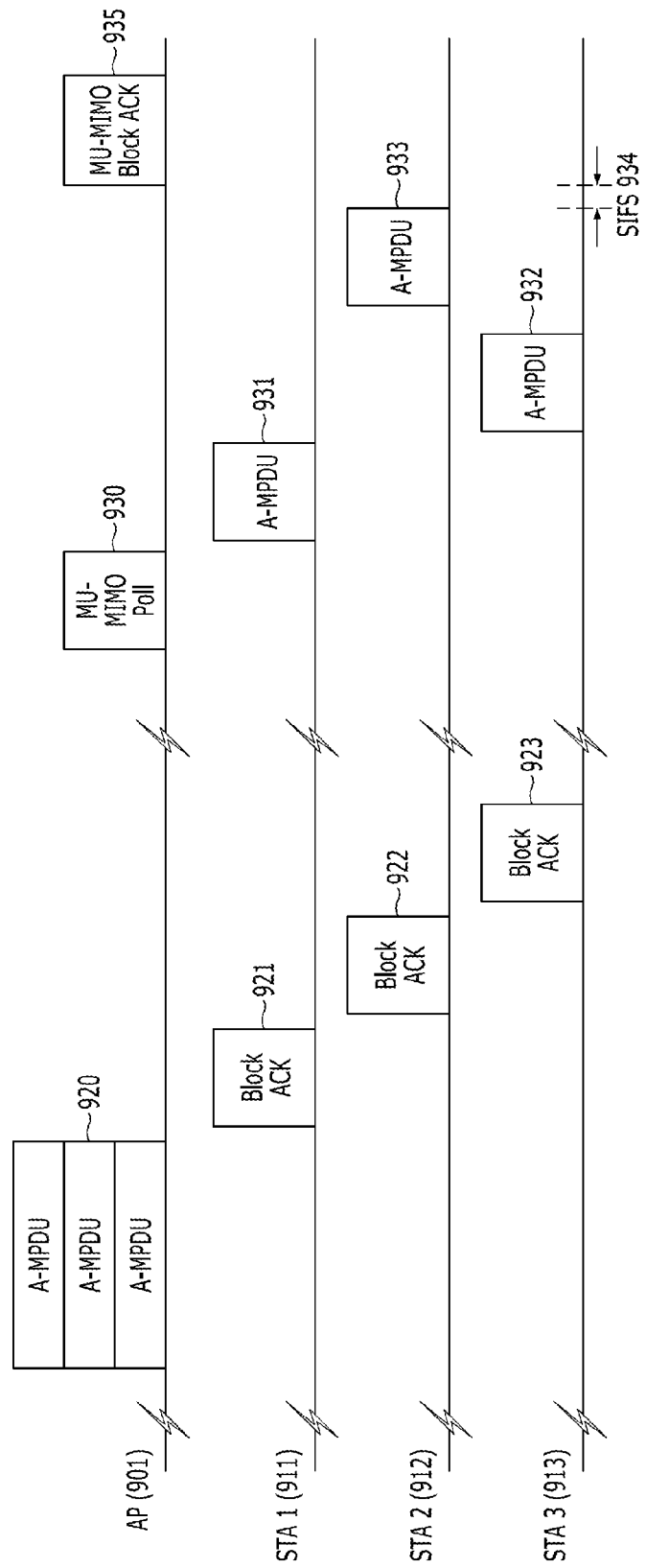
FIG. 9 is an exemplary timing diagram of a case in which a poll-request and MU-MIMO poll method is included.

FIG. 9 is an exemplary timing diagram of a case in which a poll-request and MU-MIMO poll method is included.

Referring to FIG. 9, an AP 901 transmits aggregated packets (A-MPDUs) 920 to a first station 911, a second station 912, and a third station 913. The multi-user stations 911, 912 and 913 receive the A-MPDUs 920 and sequentially transmit block ACK signals 921, 922 and 923.

At this time, it is assumed that the third station 913 transmits a block ACK frame 923 including a poll request to the AP 901 during the response procedure. When the channel usage opportunity to the uplink data is given through the next EDCA access, the AP 901 having received the block ACK frame 923 assigns higher transmission priority to the third station 913 than the second station 912, based on the poll request information received from the third station 913, when transmitting the MU-MIMO information on the multi-users.

That is, when it is assumed in FIG. 9 that the MU-MIMO poll 930 is transmitted while including the first station 911, the second station 912, and the third station 913, the MU-MIMO poll 930 assigns higher priority to the third station 913 than the second station 912. Therefore, in FIG. 9, it is assumed that the highest priority is assigned to the first station 911, and the aggregated packet 931 is transmitted to the AP 901 through the uplink. Then, it is assumed that the second highest priority is assigned to the third station 913, and the aggregated packet 932 is transmitted. It is assumed that the lowest priority is assigned to the second station 912, and the aggregated packet 933 is transmitted.

Then, the AP 901 waits for a predetermined SIPS 934 and transmits the MU-MIMO block ACK frame 935 to the stations 911, 912 and 913, wherein the MU-MIMO block ACK frame 935 includes the reception result of the aggregated packets 931, 932 and 934 from the stations 911, 912 and 913.

Figure 10:
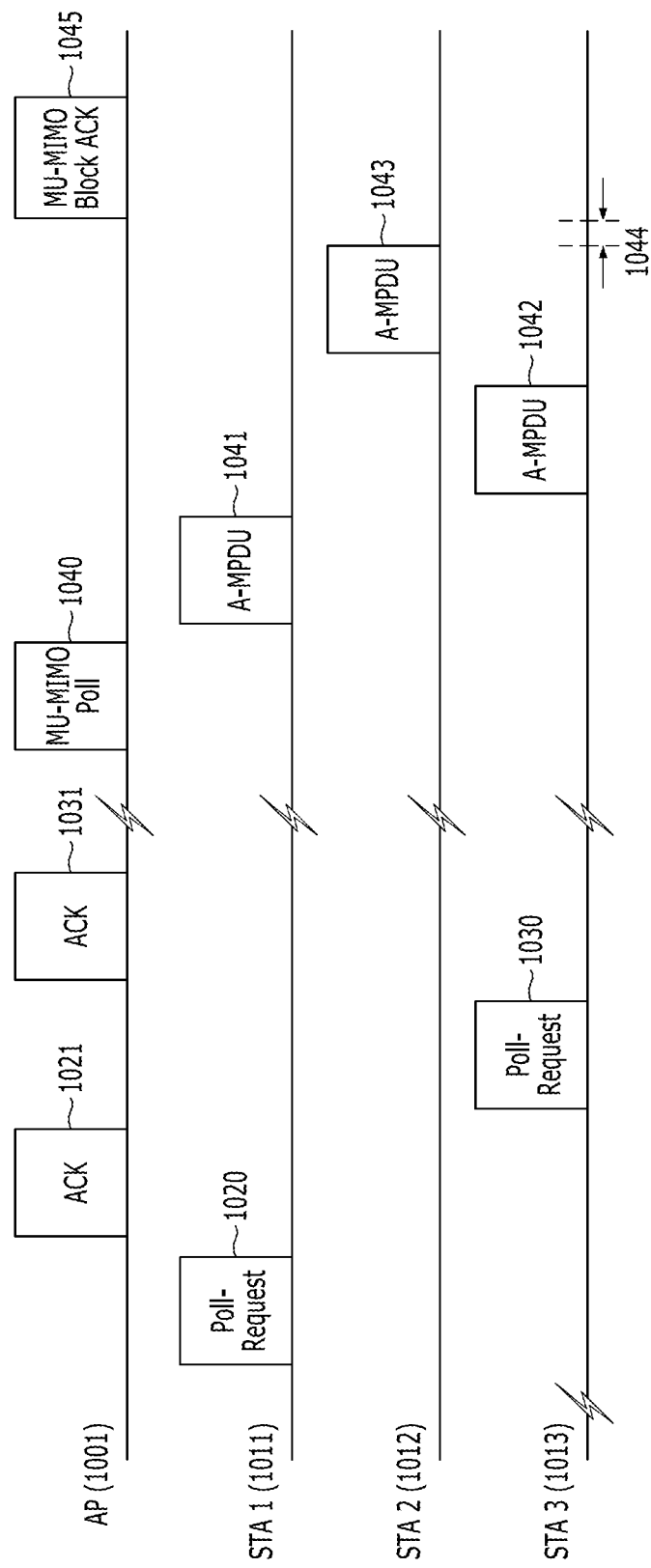
FIG. 10 is a data transmission timing diagram of a case in which data is transmitted by requesting a poll, without receiving data from an AP, according to another embodiment of the present invention.

FIG. 10 is a data transmission timing diagram of a case in which data is transmitted by requesting a poll, without receiving data from an AP, according to another embodiment of the present invention.

When there exists data to be transmitted to the uplink, a first station 1011 transmits a poll request 1020 to the AP 1001, based on an EDCA access protocol. The AP 1001 receives the poll request and transmits an ACK signal 1021. Then, when the third station 1013 transmits a poll request 1030 to the AP 1001 based on an EDCA access protocol, the AP 1001 again transmits an ACK signal 1031.

Then, the AP 1001 performs a scheduling based on the poll request received from the first station 1011 and the third station 1013, and transmits the MU-MIMO poll frame 1040 to each station. In FIG. 10, it is assumed that the priority is determined in order of the first station 1011, the third station 1013, and the second station 1012. Therefore, the first station 1011 first transmits the aggregated packet 1041 to the AP 1011 through the uplink. Then, the third station 1013 transmits the aggregated packet 1042 to the AP 1001. Finally, the second station 1012 transmits the aggregated packet 1043 to the AP 1043. As such, when the packets are received from the stations 1011, 1012 and 1013, the AP 1001 waits for a predetermined SIFS 1044 and transmits the MU-MIMO block ACK 1045 to the stations 1011, 1012 and 1013.

In order to manage the wireless resources more efficiently in the AP supporting the downlink MU-MIMO technique based on the wireless LAN system, the transmission opportunity of data to be transmitted is requested using the ACK frame, when the wireless station intending to transmit data during the downlink service procedure receives data through the downlink service. Accordingly, the EDCA contention overhead necessary for the uplink service may be reduced and the downlink service may be used more efficiently, thereby improving the wireless service performance supported to each user. Furthermore, the existing power management function and the function for compatibility can be easily applied.

While the present invention has been described with respect to the specific embodiments, it will be apparent to those skilled in the art that various changes and modifications may be made without departing from the spirit and scope of the invention as defined in the following claims.

What is claimed is:

1. A method for managing resources in a high capacity wireless communication system for communicating with two or more users in a multi-input multi-output (MIMO) scheme when a base station transmits data, the method comprising:

transmitting, by the base station, a multi-user MIMO (MU-MIMO) request-to-send (RTS) message to two or more stations in order to transmit data for an MU-MIMO downlink service, and sequentially receiving, by the base station, clear-to-send (CTS) messages from the stations in response to the MU-MIMO RTS message;

transmitting, by the base station, a network allocation vector (NAV) protection; and configuring, by the base station, data to be transmitted to the stations into aggregated packets (A-MPDUs), transmitting, by the base station, the A-MPDUs to the stations in the MIMO scheme, and respectively receiving block ACK messages from the stations in response to the A-MPDUs, wherein at least one of responses to the RTS message and the A-MPDUs includes a poll request of the users for an MU-MIMO uplink service.

2. The method of claim 1, further comprising, when the poll request notifying of a necessity of data transmission through an uplink is included in the block ACK messages received from the stations, configuring, by the base station, a poll frame based on the poll request in order to permit data transmission to the base station through the uplink, and transmitting, by the base station, the poll frame to the stations.

3. The method of claim 2, wherein the poll request notifying of the necessity of data transmission through the uplink is set using at least one of reserved bits of a block ACK control field in a block ACK message.

4. The method of claim 2, wherein, when there is an instruction for the uplink transmission to the base station upon the transmission of the poll frame, priorities of the stations are determined based on the poll frame and packet data from the stations is transmitted to the base station according to the determined priorities.

5. The method of claim 2, further comprising:

instructing, by the base station, the stations to simultaneously transmit packet data through the uplink upon the transmission of the poll frame; and receiving, by the base station, the packet data, which are simultaneously transmitted through the uplink, in the MIMO scheme.

6. The method of claim 2, wherein the poll frame comprises group addresses of the stations, addresses of the base station, information on a length of a data transmission duration used in the uplink, a block ACK information element for matching block ACK time points of receiving stations, and information of the receiving stations.

7. The method of claim 1, further comprising transmitting, by the base station, an ACK message when the poll request notifying of a necessity of data transmission from the stations through an uplink is received.

8. The method of claim 7, further comprising transmitting, by the base station, a poll frame scheduled based on the poll request received from the stations to permit the data transmission to the base station through the uplink.

9. The method of claim 8, further comprising transmitting, by the base station, a block ACK signal in the MIMO scheme with respect to packet data received from the stations after the transmission of the poll frame.

10. The method of claim 8, wherein, when there is an instruction for the uplink transmission to the base station upon the transmission of the poll frame, priorities of the stations are determined based on the poll frame and the packet data is transmitted to the base station according to the determined priorities.

11. The method of claim 8, further comprising:
instructing, by the base station, the stations to simultaneously transmit the packet data through the uplink upon the transmission of the poll frame; and
receiving, by the base station, the packet data, which are simultaneously transmitted through the uplink, in the MIMO scheme.

12. The method of claim 8, wherein the poll frame comprises group addresses of the stations, addresses of the base station, information on a length of a data transmission duration used in the uplink, a block ACK information element for matching block ACK time points of receiving stations, and information of the receiving stations.

13. The method of claim 1, wherein, when there is an instruction for the uplink transmission to the base station upon the transmission of a poll frame, priorities of the stations are determined based on the poll frame and packet data from the stations is transmitted according to the determined priorities.

14. A method for managing resources in a high capacity wireless communication system for communicating with two or more users in a multi-input multi-output (MIMO) scheme when a base station allocates the resources, the method comprising:
sequentially receiving, by the base station, block ACK frames from two or more stations, the block ACK frames including a poll request;
transmitting, by the base station, ACKs to the stations in response to the poll request of the users when the poll request is received from the stations in order to transmit data for a multi-user MIMO (MU-MIMO) uplink service; and
transmitting, by the base station, a MU-MIMO Poll frame scheduled based on the poll request to the stations in order to permit data transmission to the base station through an uplink; and
configuring, by the stations, data to be transmitted to the base station into aggregated packets (A-MPDUs), transmitting, by the stations, the A-MPDUs to the base station in the MIMO scheme, and receiving, by the stations, a block ACK message from the base station,
wherein the poll request is received through at least one of responses to an MU-MIMO request-to-send (RTS) message and A-MPDUs for an MU-MIMO downlink service, and
wherein the poll frame comprises group addresses of the stations, addresses of the base station, information on a length of a data transmission duration used in the uplink, a block ACK information element for matching block ACK time points of receiving stations, and information of the receiving stations.

15. The method of claim 14, wherein, when there is an instruction for the uplink transmission to the base station upon the transmission of the poll frame, priorities of the stations are determined based on the poll frame, and the A-MPDUs from the stations are sequentially transmitted to the base station according to the determined priorities.

16. The method of claim 14, further comprising:
instructing, by the base station, the stations to simultaneously transmit the A-MPDUs through the uplink upon the transmission of the poll frame; and
receiving, by the base station, the A-MPDUs, which are simultaneously transmitted through the uplink, in the MIMO scheme.

17. The method of claim 14, wherein the block ACK frames are protected by a network allocation vector (NAV).

18. The method of claim 17, wherein the poll request included in the block ACK frame is set using at least one of reserved bits of a block ACK control field in the block ACK frame.

19. The method of claim 17, further comprising:
instructing, by the base station, the stations to simultaneously transmit the packet data through the uplink upon the transmission of the poll frame; and
receiving, by the base station, the packet data, which are simultaneously transmitted through the uplink, in the MIMO scheme.

20. A method for managing resources in a high capacity wireless communication system for communicating with two or more users in a multi-input multi-output (MIMO) scheme when a base station allocates the resources, the method comprising:
transmitting, by the base station, ACKs to two or more stations in response to a poll request of the users when the poll request is received from the stations in order to transmit data for a multi-user MIMO (MU-MIMO) uplink service; and
transmitting, by the base station, a MU-MIMO Poll frame scheduled based on the poll request to the stations in order to permit data transmission to the base station through an uplink,
wherein the poll request is received through at least one of responses to an MU-MIMO request-to-send (RTS) message and aggregated packets (A-MPDUs) for an MU-MIMO downlink service, and wherein the poll frame comprises group addresses of the stations, addresses of the base station, information on a length of a data transmission duration used in the uplink, a block ACK information element for matching block ACK time points of receiving stations, and information of the receiving stations.

* * * * *